United States Patent
Castin et al.

(10) Patent No.: US 11,699,168 B2
(45) Date of Patent: Jul. 11, 2023

(54) SYSTEM AND METHOD FOR AGGREGATING ADVERTISING AND VIEWERSHIP DATA

(71) Applicant: Wavefront Software, LLC, St. Petersburg, FL (US)

(72) Inventors: Andrew Castin, Madison, NJ (US); Lou Giocondo, St. Petersburg, FL (US); Scott Portugal, South Salem, NY (US)

(73) Assignee: WAVEFRONT SOFTWARE, LLC, St. Petersburg, FL (US)

( * ) Notice: Subject to any disclaimer, the term of this patent is extended or adjusted under 35 U.S.C. 154(b) by 0 days.

(21) Appl. No.: 17/724,657

(22) Filed: Apr. 20, 2022

(65) Prior Publication Data

US 2022/0343362 A1    Oct. 27, 2022

Related U.S. Application Data

(60) Provisional application No. 63/178,069, filed on Apr. 22, 2021.

(51) Int. Cl.
*G06Q 30/02* (2023.01)
*G06Q 30/0242* (2023.01)
*G06Q 30/0241* (2023.01)

(52) U.S. Cl.
CPC ..... *G06Q 30/0246* (2013.01); *G06Q 30/0244* (2013.01); *G06Q 30/0247* (2013.01)

(58) Field of Classification Search
CPC ........... G06Q 30/0246; G06Q 30/0244; G06Q 30/0247
See application file for complete search history.

(56) References Cited

U.S. PATENT DOCUMENTS

| | | | |
|---|---|---|---|
| 7,673,327 B1* | 3/2010 | Polis | G06F 16/958 713/153 |
| 7,873,541 B1 | 1/2011 | Klar et al. | |
| 2002/0144174 A1 | 10/2002 | Nwabueze | |
| 2009/0259518 A1 | 10/2009 | Harvey et al. | |
| 2010/0223244 A1 | 9/2010 | Sinha et al. | |
| 2014/0058826 A1 | 2/2014 | Ogawa | |
| 2014/0081742 A1* | 3/2014 | Katsur | G06Q 30/0241 705/14.46 |
| 2016/0119689 A1* | 4/2016 | Hood | H04N 21/25891 725/14 |
| 2016/0378762 A1* | 12/2016 | Rohter | G06F 16/285 707/728 |
| 2017/0048339 A1* | 2/2017 | Straub | G06F 16/2379 |

(Continued)

OTHER PUBLICATIONS

Mullen, Craig "Using Views in Microsoft SQL Server", Mullins Consulting Inc. Feb. 1999. Available at: https://web.archive.org/web/20010221113802/https://www.craigsmullins.com/cnr_0299b.htm (Year: 1999).*

(Continued)

*Primary Examiner* — Eric R Netzloff
(74) *Attorney, Agent, or Firm* — Maier & Maier, PLLC

(57) ABSTRACT

A system and method for providing and synthesizing data for publishers operating in the connected television ecosystem. Data from third party reporting platforms may be combined to present a unified view. Audience engagement may be measured, observed, and combined in a novel manner, providing unique insights to users.

6 Claims, 3 Drawing Sheets

(56) References Cited

U.S. PATENT DOCUMENTS

| | | | |
|---|---|---|---|
| 2017/0308578 A1* | 10/2017 | Chen | G06F 16/2456 |
| 2018/0035142 A1* | 2/2018 | Rao | H04N 21/4667 |
| 2018/0091868 A1* | 3/2018 | Borok | G06Q 30/0242 |
| 2018/0113901 A1* | 4/2018 | Menzies-Smith | G06F 16/24535 |
| 2020/0074099 A1* | 3/2020 | Felice-Steele | G06F 9/54 |
| 2020/0226130 A1* | 7/2020 | Amzal | G06F 18/253 |
| 2020/0233905 A1* | 7/2020 | Williams | G06F 16/904 |

OTHER PUBLICATIONS

Stack Overflow, "SQL Views vs. Database Abstraction (in code)", Jun. 15, 2011. Available at: https://stackoverflow.com/questions/6358778/sql-views-vs-database-abstraction-in-code: for a overview of SQL views and layers of views and caching execution plans. (Year: 2011).*

Notification of Transmittal of the International Search Report and the Written Opinion dated Aug. 17, 2022 in corresponding International Application No. PCT/US2022/025716; 8 pages.

Spenkuch et al., "Political advertising and election results." The Quarterly Journal of Economics 133.4 (2018): 1981-2036, May 5, 2018, pp. 1-45, Retrieved on Jul. 24, 2022 from <https://academic.oup.com/qje/article-abstract/133/4/1981/4993157>.

\* cited by examiner

SYSTEM AND METHOD FOR AGGREGATING ADVERTISING AND VIEWERSHIP DATA

BACKGROUND

In order for publishers to operate in the connected television ecosystem, the publishers need to partner with multiple content platforms (i.e., distribution platforms), which may all operate disparate systems across a variety of business models (such as, for example, free applications, subscriber video-on-demand, advertiser-supported video-on-demand, streaming, and so forth). Across each platform, the publishers can maintain the right to monetize some, most, or all of the advertising inventory created by their content. In these cases, each distribution platform can also monetize some, most, or all of the advertising inventory created by the publishers' content. Software-as-a-Service ("SaaS") business intelligence ("BI") platforms are built as data aggregators and visualizers; however, such platforms are not automating the collection of data. Media BI platforms (such as comScore, Nielsen, Quantcast, and Conviva) use viewstream data to conduct measurements, but also are not aggregating data from third party platforms.

Today, most DPs offer reporting user interfaces ("UIs") to their content partners, which can report on a variety of engagement and monetization metrics. Each reporting platform typically requires unique login credentials and a particular configuration relating to finding data, understanding the data, and modifying, downloading, and printing reports. Where reporting UIs aren't available, some DPs may make such data available via emailed reports.

Many publishers also utilize third-party content syndication platforms, which also offer reporting services. Most publishers typically have a variety of direct and indirect relationships with DPs and third-party syndication platforms. Additionally, most publishers may operate their own advertising technology stacks, which can include a primary ad server and secondary partnerships through programmatic marketplace platforms. Primary advertising servers may report on all demanded data that generated both by first-party ad campaigns and by campaigns that are run through the programmatic marketplace of the particular advertising server. Third party marketplaces may also offer reporting, but can require separate login credentials and can report on different metrics.

A solution that can aggregate, organize, transform, normalize, and visualize advertising revenue and viewership data for publishers operating in the connected television ecosystem is therefore desired.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Figure 1:
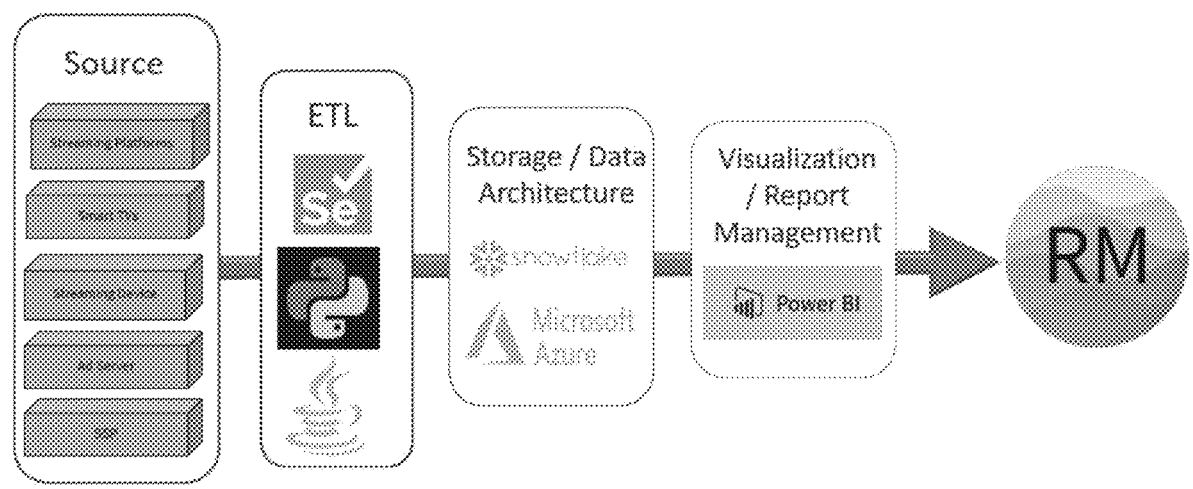
FIG. 1 shows an exemplary embodiment of a system for aggregating advertising revenue.

Aspects of the invention are disclosed in the following description and related drawings directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

According to at least one exemplary embodiment, a system and method for aggregating advertising revenue is disclosed. The system may be adapted to consolidate data from various advertising platforms, and to create a set of dashboards that enable publishers to create transparency into their business and intersect various metrics, allowing users of the system to easily evaluate how various platforms drive revenue and viewership. By aggregating and standardizing data from disparate third-party reporting platforms in the connected TV ecosystem, the system can present several advantages. For example, the tasks of logging into multiple platforms, converting the data into a format that can be combined with other data sets, and then creating dashboards which filter and sort the data into key performance indicators can be automatically performed by the present system. In this manner, the inefficiencies of performing such tasks manually for every platform can be avoided.

The system can include 3 layers: data collection & storage; data organization & visualization; and account management & administrative controls. The system may be adapted to aggregate first and third-party viewership and advertising data from multiple systems, providing an advantage over collecting information directly from in-stream sources (e.g., via pixels or tags). A variety of data sources often must be scraped to pull the data. Extracted data may not be in any usable format and may still need to be aggregated and formatted. In-stream data sources may include video ads within, before, or after some video content. An exemplary embodiment may implement VAST (Video Ad Serving Template) tags which may deliver the advertisement Tracking pixels within the VAST tags may be scraped for information through the in-stream videos.

To facilitate the aggregation functionality of the system, the system may be provided with a plurality of automated applications (commonly referred to as "bots"). Such automated applications may be written in Python, or any other language that enables the system to function as described herein. The automated applications may be adapted to automate the data consolidation process on behalf of a user of the system. For example, the data consolidation process performed by the automated applications can include: logging into each data source out of a plurality of data sources; filling out any and all necessary parameters for data retrieval; entering a date range for data retrieval; selecting an appropriate report format and downloading the data, for example as a .csv or Excel file, for subsequent importing of the data. The automated applications may further be configured to retrieve data from any desired date or date range; for example, the automated applications may be configured to retrieve data from the previous day, and/or to loop through a date range and retrieve data for each day in the date range. Furthermore, the automated applications may be designed such that each data source only requires a single version of the automated application. Customization of the automated application for different users may be facilitated by altering parameters and configuration files of the automated application, rather than developing a new automated application for each user.

The system may further be adapted to load data from the disparate data sources into a cloud-based database (such as, for example, Snowflake). Data sources or data-feeds may include, but are not limited to, Amagi, Beachfront, EMX, Freewheel, Future Today, Index Exchange, Wurl, OTTera, Playwire, Pluto, Pubmatic, Roku, Smart, SptiX, Springserve, Superawesome, Tubi, Undertone, Unruly, Vix, Wurl, Xandr, Xumo.

The cloud-based database may be adapted to provide for semi-structured data. The system may therefore be adapted to convert spreadsheet-based data, such as an Excel or .csv file, into a semi-structured data table. For example, the system may be adapted to convert each tab and/or page in an Excel workbook into a semi-structured data set, for example a json data set. Subsequently, each tab and/or page of the Excel workbook may be given a unique value in a field. This allows the data to be stored in the same table, but also to be queried and retrieved as separate tables. The system may further be adapted to automatically generate the query language (for example, SQL code) that allows the semi-structured data to be queried as if it were stored in a regular database table. Such data may be stored in a raw schema and may later be converted to actionable insight. A custom application, which may be written in Python, may be adapted to perform this task.

An exemplary description of the schema according to embodiments of the present invention is shown in the table below.

| Schema | Description |
| --- | --- |
| RM_RAW | Capture the raw data from the data providers. Here the data is saved in a format that can easily be reference by the next step. (Key-Value) |
| RM_ETL | The data is translated from RM_RAW pulling out specific columns for the source data. |
| RM_CORE | The data is normalized and saved into RM_CORE. Data sources are combined into similar data. |
| RM | Business rules are applied to the data from RM_CORE, and save into the RM schema for future reports. |

RM_ETL data may include viewership data (e.g., source of the content, date, client, distribution platform, show name, season or episode number, total time watched, viewership minutes, and unique views) and ad server data, such as the client, source, date, distribution platforms, supply-side platforms (SSP), demand-side platforms (DSP), purchased impressions, cost per thousand (CPM), revenue, revenue share, ad fill rate, daily total impressions, DMA code/name, etc.)

RM_CORE data may aggregate data from multiple different sources into a comprehensive analysis by matching the same or similar metrics. The RM schema or RM view layer may include multiple views (stored queries) that may be used by reporting applications. In an exemplary embodiment, the RM schema may serve as an abstraction layer for RM_CORE. If changes are needed to a report or to RM_CORE (such as table or field name changes, for example) the RM view layer can be easily modified to accommodate those changes while presenting a stable interface for the reporting applications.

Furthermore, in addition to gathering data, the data may then be organized in a way that is conducive for analysis. The system may include a data model/schema for the data that is adapted to intelligently collate, aggregate, and organize the raw data. Such data structures may be stored, for example, in an RM_CORE schema.

Additionally, the system may include a transformation process to turn the data from its raw form into the final RM_CORE schema. Such transformation views may be stored in the RM_ETL schema. For example, the transformation may standardize platform names and SSP, Additionally, so as to provide a layer of protection from changes in the underlying layer and the business intelligence layer, additional views may be stored in a separate schema, for example an RM schema. Thus, business intelligence reports and any other queries may be performed against the RM view alone. Consequently, if changes in the underlying data occur, such as, for example, a field name change, a table change, or a late occurring business rule, the views in the RM schema may be adapted to accommodate the changes without requiring a reconfiguration of the business intelligence application.

Consequently, there is provided a business intelligence application which is adapted to present a user with a simple means to obtain actionable data-driven insights. The metrics and charts of the system may be specifically adapted to communicate actionable data-driven business insight. Furthermore, client logins, rights and roles may be handled such that, while the data is shared in the same tables, a user may only be allowed to see their own information.

Referring now to the exemplary schematic flowchart in FIG. 1, FIG. 1 may illustrate an exemplary method for providing an exemplary platform. In a first step, an exemplary embodiment may query multiple sources for information and data. For example, data may be retrieved from streaming platforms, smart televisions, streaming devices, ad servers, and/or supply-side platforms (SSP). Next, ETL (extract-transform-load) methods may be applied to the raw data taken from the sources. For example, specific information can be extracted from the source or raw data, such as advertising revenue from a particular show or movie. The ETL data may then be stored in a unique data architecture to allow for faster and more efficient reproduction of the data. For example, Snowflake or Microsoft Azure cloud systems may be implemented. Finally, data which is organized in the unique data architecture can be easily visualized in the form of a report or other intuitive format. In an exemplary embodiment, a user interface may be implemented for presenting the visualizations or reports.

Figure 2:
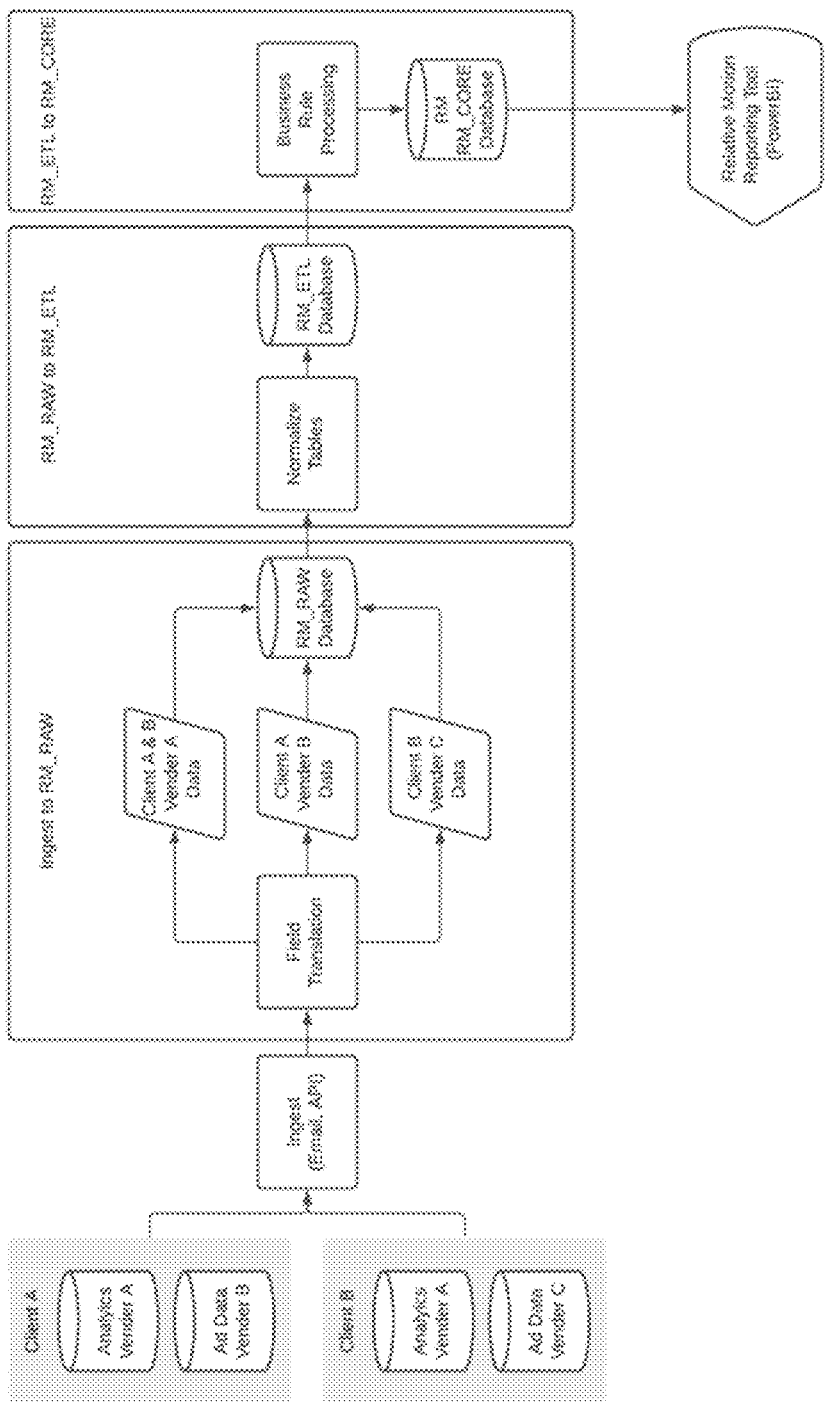
FIG. 2 shows data processing according to an exemplary embodiment of a system and method for aggregating advertising revenue.

FIG. 2 may illustrate another schematic flowchart showing an exemplary method for aggregating the data. In this exemplary embodiment, each client (Client A and Client B) may be associated with one or more Analytics Venders or Ad Data Venders. The data from each of the analytics venders and ad data venders ingested in a first step to identify raw data. Identifying and collating raw data may include field translations of the data from each vender before storing the data in a raw database in a key-value format. The field translations may simplify and standardize the data by, for example, extracting show and episode names. Next, the raw data tables can be normalized. Each source may have its own names and data formats for the fields. These may be normalized in a combined table such that the data can be reported on across sources. The normalized data may be entered into a subsequent database, referred to as the "ETL database". Data from the ETL database may be processed according to one or more business rules in order to provide the core database. The core database may be accessible via a user interface or other reporting tools.

Figure 3:
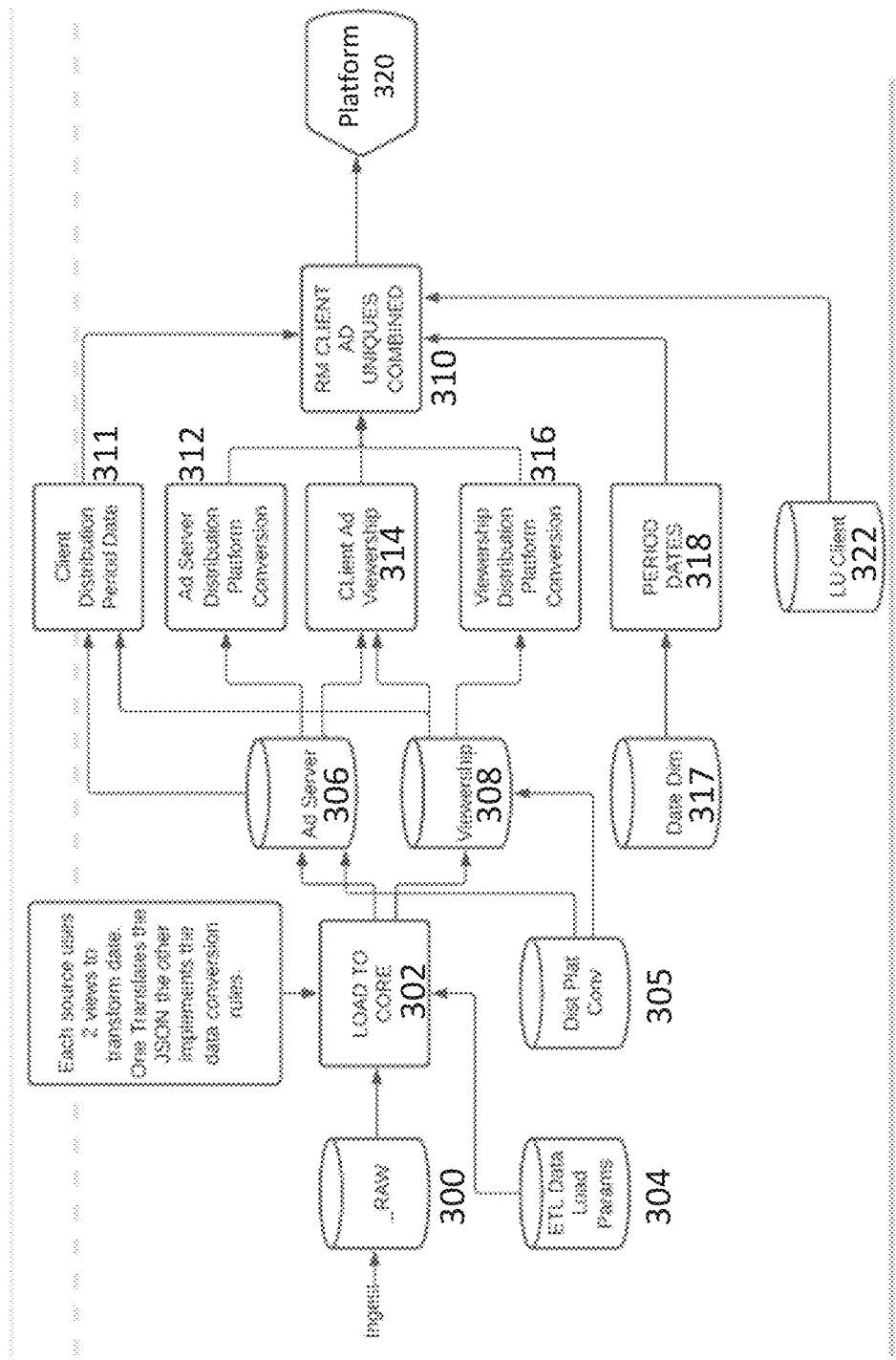
FIG. 3 shows a data model according to an exemplary embodiment of a system and method for aggregating advertising revenue.

Referring now to the exemplary embodiment in FIG. 3, FIG. 3 may illustrate an exemplary schematic flowchart of a method for providing advertising information to a user. An exemplary embodiment may begin with a raw data table 300 which is loaded to the core 302. Each source may use 2 views to transform the data; one may translate the JSON and a second may implement the data conversion rules. The load to core process may translate and normalize the raw data based on ETL data load parameters 304. The data may then be loaded to the Ad Server 306 or Viewership 308 core tables.

The programs that load the data to the _RAW tables in JSON format trigger a snowflake procedure keyed to the source of the data. The load to core procedure may user parameters from the load parameters table to load the data to either the Ad Server 306 or Viewership 308 core tables. Data sources may be associated with an ID that maps to a table containing the relevant load parameters. The table may identify the destination table, source identifier, view that maps the input data to columns in the core tables, and the name of the raw table that the data comes from. The business logic for converting the JSON data is incorporated in Snowflake views that allow the data to be directly inserted into the Core tables. The business logic may include SQL that converts RAW data to match the format in the RAW tables. For example, in the Viewership table 308, the viewership minutes may come in a variety of formats. The views may convert the viewership time from minutes to seconds, for example. Some of the views may use a table that converts the ingested Distribution Platforms to more standard names.

An exemplary embodiment may include a combined view 310 that provides a union to 3 views: Ad Server Distribution Platform Conversion 312, Viewership Distribution Platform Conversion 316 and Client Ad Viewership 314. The first 2 views may manipulate the Distribution Platform for some sources. The Client Ad Viewership view may join viewership and ad server together to calculate revenue per session. In an exemplary embodiment, the 3 views may include data elements common across all 3 views such as period, client ID, client name, and date. These variables may be arranged as columns and may allow for the union of the 3 views by linking data in the three views via the common data elements. Each page may report data from one type of data.

The Period Dates table 318 is used to define data for different date ranges. We can identify data for Yesterday, Prior Day, Last 7 Days, Prior 7 Days, Month to Date, LMTD and Year to Date. These period identifiers are the reporting view to simplify period reporting. The combined view 310 may be accessed by each user via a platform 320. A period dates view may be used to implement a data reporting technique that identifies the dates that represent data ranges. The logic in the view that dynamically identifies the date that represents, for example, 'yesterday', a prior day, the last 7 days, last month to date, year to date, and the like. An exemplary embodiment may filter data based on any contemplated date range or descriptor. An exemplary embodiment may include a look-up client (LU Client) which may associate a client ID with a client name or other identifier.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for presenting advertising data from a plurality of data sources, comprising:

loading advertisement revenue data and viewership data from the plurality of data sources retrieved from a supply-side platform and/or a demand-side platform, by logging-into or accessing each of the plurality of data sources, entering at least one parameter for data retrieval, and storing the advertisement revenue and viewership data in a key-value pair;

normalizing the advertisement revenue and viewership data into core data by:

extracting a plurality of common metrics common to two or more of the data sources, the common metrics comprising a show and episode identifier, a time period, a client identifier, and a date;

combining the advertisement revenue and viewership data from the two or more data sources based on the common metrics, storing the combined advertisement revenue and viewership data as core data wherein the core data identifies the common metrics; and presenting the core data by:

receiving a user query;

generating SQL code based on the user query;

executing the SQL code to query the core data;

applying one or more business rules to the core data; and presenting the core data retrieved from the SQL code based on the applied business rules.

2. The method for processing advertising data of claim 1, wherein organizing the raw data further comprises storing the combined raw advertising and viewership data in an ad server.

3. The method for processing advertising data of claim 1, further comprising receiving input from a user based on a set of user preferences, wherein the user preferences comprise at least a date or date range.

4. The method for processing advertising data of claim 1, wherein the core data is presented via a view layer, wherein alterations to the core data are not reflected in the view layer.

5. The method for processing advertising data of claim 1, further comprising applying an ad server distribution platform conversion, and a viewership distribution platform conversion.

6. The method for processing advertising data of claim 1, wherein the presenting the core data further comprises selecting a view from a plurality of views and presenting the core data based on the selected view.

\* \* \* \* \*